United States Patent [19]

Howe

[11] 4,294,874

[45] Oct. 13, 1981

[54] SILICATE-CONTAINING LATEX COATING COMPOSITIONS

[75] Inventor: Mark J. Howe, Pittsburgh, Pa.

[73] Assignee: PPG Industries, Inc., Pittsburgh, Pa.

[21] Appl. No.: 59,825

[22] Filed: Jul. 23, 1979

[51] Int. Cl.$^3$ .................. B05D 1/18; B05D 3/02
[52] U.S. Cl. .................. 427/393; 427/440; 260/29.6 S; 260/29.7 S
[58] Field of Search .................. 427/393, 440; 260/29.6 S, 29.7 S

[56] References Cited

U.S. PATENT DOCUMENTS 3,908,066 9/1975 Parkinson .................. 417/393 X
3,933,706 1/1976 Momiyama et al. .......... 260/29.2 X

FOREIGN PATENT DOCUMENTS 1285479 8/1972 United Kingdom .

OTHER PUBLICATIONS

Technical Service Report N-53, Oct. 30, 1973.
*Sodium Silicates in Protective Coatings*, Diamond Shamrock Chemical Company, Nov. 30, 1978.

*Primary Examiner*—Michael R. Lusignan
*Attorney, Agent, or Firm*—Charles R. Wilson

[57] ABSTRACT

Storage stable coating compositions consist essentially of, on a film-forming solids basis, from about 15 percent to about 40 percent of an alkali metal or quaternary ammonium silicate and from about 60 percent to about 85 percent of a latex. The compositions are storage stable and are especially useful for the filling of low grade wood products.

9 Claims, No Drawings

SILICATE-CONTAINING LATEX COATING COMPOSITIONS

BACKGROUND OF THE INVENTION

The subject invention relates to aqueous coating compositions. More particularly, the invention relates to aqueous coating compositions especially useful for the filling of wood.

The customary procedure in the finishing of wood surfaces, e.g., furniture, millwork, panelling, etc. with a clear topcoat involves first the application of an optional sealer coat and a filler coat. The sealer coat, if applied, seals the wood and provides a base for the filler coat. The primary function of the filler coat is to fill the grooves and other surface imperfections found in wood. Once filled, the coated wood product is sanded so as to give it a smooth surface. Thus, subsequent application to the wood of a topcoat and/or print coat is to a substantially flat surface.

Filler coats must have the ability of drying quickly to a hard surface so as to facilitate a subsequent sanding step and preferably be applied in one pass so as to minimize handling. The problem of applying a filler coat in one pass is especially difficult with respect to low grade wood. Low grade woods, such as lauan, have deep grooves which must be filled. Accordingly, any filler which is to be applied in one pass must have a shear viscosity low enough that it is able to fill the groove, yet a yield point high enough that the coating bridges the groove and does not itself contract upon drying. Many different types of filler coating compositions are known. However, as above indicated, there is still a need for a filler composition which has a rheology which allows it to be applied in a conventional manner to low grade wood. Preferably, the application of the filler could be done in one pass.

It is also described that the filler coating composition be water-based. Many organic solvent-based coating compositions are known. However, the organic solvents themselves are costly. Additionally, equipment must be installed so as to remove the solvent from the atmosphere following its application and evaporation from the coated substrate. Water, of course, is cheap and does not have an inherent pollution problem.

There have now been found filler coating compositions which are capable of application in one pass to low grade wood. The coating compositions additionally are water-base and storage stable over a prolonged period of time.

As used herein, all percentages and ratios are by weight unless otherwise indicated.

SUMMARY OF THE INVENTION

Storage stable coating compositions consist essentially of, as film-forming solids, from about 15 percent to about 40 percent of an alkali metal or quaternary ammonium silicate and from about 60 percent to about 85 percent of a latex. The coating compositions are especially useful for the filling of wood or wood-like products.

DETAILED DESCRIPTION OF THE INVENTION

The coating compositions herein consist essentially of an alkali metal or quaternary ammonium silicate and water-insoluble polymeric particles in a latex form. The individual components of the compositions as well as their methods of application are described in the following paragraphs.

Coating compositions contain as an essential component an alkali metal or quaternary ammonium silicate. The level of silicate in the composition, as film-forming solids, ranges from about 15 percent to about 40 percent, preferably from about 20 percent to about 30 percent, of the composition. This amount of silicate is necessary for the composition to have the proper rheology and the coating to have the desired flexibility and durability. Suitable alkali metal silicates include lithium silicate, potassium silicate, sodium silicate and mixtures thereof. A preferred silicate is sodium silicate having an $SiO_2:Na_2O$ ratio of from about 1:2 to about 3.9:1.

The balance of the film-forming solids portion of the compositions is a synthetic polymeric latex. Several different latexes are known and can be used herein for the purpose of providing flexibility to the coating. The flexibility in a wood coating is needed due to the propensity of wood to expand and contract with changing temperatures and moisture conditions. Preferably, the latex remains stable when combined with the alkali metal silicate. For purposes herein, the compositions are considered stable when stored at 50° C. for at least four weeks without an irreversible gel forming. Any latex can be used which meets this stability criterion; it has been found, though, the acrylic latexes are not suitable for use because of their instability in the presence of the aqueous silicate. Preferred latexes are based on styrene-butadiene copolymers and vinyl chloride-alkylene copolymers.

Styrene-butadiene copolymers are well known and are commercially available. The butadiene used in the copolymer with the styrene is a 1,3 butadiene. The weight average molecular weight determined by gel permeation chromatography, using a polystyrene standard, of the copolymer varies from about 100,000 to about 1,000,000. The weight ratio of styrene to butadiene also varies widely, i.e., from about 35:65 to about 90:10, preferably from about 65:35 to about 85:15. Preferred styrene-butadiene latexes are carboxylated styrene-butadiene copolymers where up to about 10% of a carboxylic acid, e.g., acrylic or methacrylic acid is reacted with the styrene-butadiene.

The vinyl chloride-alkylene copolymer is also a class of materials well known and commercially available. Various alkylenes can be used such as ethylene, propylene, n-butene and isobutene. Preferred is the ethylene. Aqueous latexes of the vinyl chloride-alkylene copolymer are conventionally prepared by polymerizing the monomers by suspension or emulsion polymerization in the presence of a redox catalyst system and an emulsifying agent in water at elevated pressures. Weight average molecular weights determined by gel permeation chromatography, using a polystyrene standard, vary from about 100,000 to about 1,000,000. The weight ratio of vinyl chloride to alkylene ranges from about 75:25 to about 95:5, preferably from about 85:15 to about 95:5.

Solids content of the latexes also varies widely, though a solids content of about 40 percent to about 70 percent is preferred. The level of the latex found in the coating compositions ranges from about 60 percent to about 85 percent, preferably from about 70 percent to about 80 percent, of the coating composition, as film-forming solids. The total level of film-forming solids in the coating compositions is at least about 2.5 percent.

Coating compositions of the invention can contain other optional conventional additives. These additives include various defoamers, fungicides, flow control agents, surfactants and anti-mar agents. While the compositions are water base, they can also contain a minor amount of an organic solvent, i.e., less than about 20 percent of the total volatiles. Pigments, especially calcium carbonate, are often included in the compositions at a level ranging from about 50 percent to about 75 percent by volume of solids.

The coating compositions are especially useful when applied to a wood substrate, though other substrates can be used, such as metal, plastic and wallboard. Various coating methods can also be used, including brushing, roll coating and spraying. However, as above indicated the primary use of the coating compositions is in the roll coating of flat wood, e.g. lauan or wood-like products, e.g. particle board. This is as a result of the compositions having a rheology which have a relatively high yield point to allow bridging within a surface imperfection, yet have a relatively low shear viscosity to allow conventional application. The amount applied is adjusted over a wide range, depending upon the degree of filling and subsequent sanding needed. Most surprisingly, the composition can be satisfactorily applied in one pass on low grade wood such as lauan. After application, the coated substrate is dried, preferably by exposure to elevated temperatures to remove the water and effect a cure. The resultant substrates are thereafter sanded so as to provide a flat surface. The coated substrates are easy to sand and possess desired characteristics such as water and organic solvent resistance.

The examples which follow are illustrative of the invention with Example I representing a preferred embodiment.

EXAMPLE I

A coating composition is formulated as follows:

|  | Percent |
| --- | --- |
| Sodium silicate (Si$_2$:Na$_2$O = 3.2:1, 38.3% solids) | 5.2 |
| Styrene/butadiene latex, (85:15, 51.9% solids)[1] | 11.6 |
| Defoamer[2] | 0.2 |
| Surfactant[3] | 0.2 |
| Calcium carbonate pigment | 58.5 |
| Talc | 6.7 |
| Clay | 1.3 |
| Thickener[4] | 0.9 |
| Water | 15.4 |

[1]Available from Goodyear Tire & Rubber Co. as LPR-4577C.
[2]A blend of Drew L-475 available from Drew Chem. Corp. and Nalco 2300 available from Nalco Chemical Co.
[3]Available from Diamond Shamrock Co. as Nopcosperse 44.
[4]Available from Rohm & Haas Co. as Aerosol A-1.

The above composition is applied by roll coater to a lauan substrate. The amount applied completely fills the grooves and other surface imperfections in the lauan. After excess coating is wiped off, the substrate is passed through transco oven maintained at 150° C. at a rate of about 0.5 m/sec. Residence time in the oven is 17 seconds.

A close examination of the coated lauan shows it to have a smooth flat surface. The surface can be sanded, if desired, to provide an even high quality surface.

Additionally, the coating composition is stable as evidenced by its ability to not form an irreversible gel when stored for four weeks at 50° C.

EXAMPLE II

A composition is formulated as in Example I except for the substitution of an ethylene-vinyl chloride latex in place of the styrene/butadiene latex. The latex has a 49 percent solids content and is available from Air Products and Chemicals Inc. as Airflex 6530.

Application of the composition in the same manner as in Example I to a lauan substrate satisfactorily fills the substrate's surface and gives a surface which can be subsequently sanded to a smooth finish.

The coating composition is storage stable when stored for four weeks at 50° C.

EXAMPLE III

A styrene-butadiene latex having a styrene:butadiene ratio of 35:65 is used in place of the latex of Example I, with all other components and processing conditions remaining the same. The resultant coated lauan is satisfactorily filled and sandable.

EXAMPLE IV

Substitution of a sodium silicate, SiO$_2$:Na$_2$O = 1:2, for the sodium silicate of Example I also gives a suitable coating composition having good rheology, but slightly less durable film-forming properties.

EXAMPLE V

A lower cost formula variation of Example I is made based on 4.7 percent of the sodium silicate, 10.5 percent of the latex and 16.6 percent of the water with the remaining components remaining constant. This composition also satisfactorily fills low grade wood such as lauan.

What is claimed is:

1. A method of filling wood or a wood-like product, comprising the steps of:
    (a) applying a latex composition to the wood or wood-like product wherein the composition has a film-forming solids content of at least about 2.5 percent and consists essentially of:
        (1) an alkali metal silicate, and
        (2) a synthetic polymeric latex selected from the group consisting of styrene-butadiene copolymers, vinyl chloride-alkylene copolymers and mixtures thereof,
    wherein, as film-forming solids, the silicate is present in an amount of from about 15 percent to about 40 percent and the latex is present in an amount of from about 60 percent to about 85 percent; and
    (b) drying the coated product of step (a) so as to remove water and cure the composition to produce the filled wood or wood-like product.

2. The method of claim 1 wherein the latex is based on a styrene-butadiene copolymer.

3. The method of claim 1 wherein the latex is based on a vinyl chloride-ethylene copolymer.

4. The method of claims 1, 2 or 3 wherein the composition consists essentially of, as film-forming solids:
    (1) from about 20 percent to about 30 percent of the alkali metal silicate; and
    (2) from about 70 percent to about 80 percent of the latex.

5. The method of claim 4 wherein the composition additionally consists essentially of pigment at a level of from about 50 percent to about 75 percent by volume of solids.

6. The method of claim 5 wherein the pigment is calcium carbonate.

7. The method of claim 1 wherein the wood or woodlike product is lauan.

8. The method of claim 7 further comprising the step of sanding the dried product to give a wood or woodlike product having a substantially uniform surface.

9. The method of claim 1 wherein the wood or woodlike product is particle board.

* * * * *